E. G. SWARTZ.
LUMBER CRADLE.
APPLICATION FILED MAY 18, 1920.

1,401,206.

Patented Dec. 27, 1921.
2 SHEETS—SHEET 1.

Inventor
Edward G. Swartz
Gillson & Gillson
Attorneys.

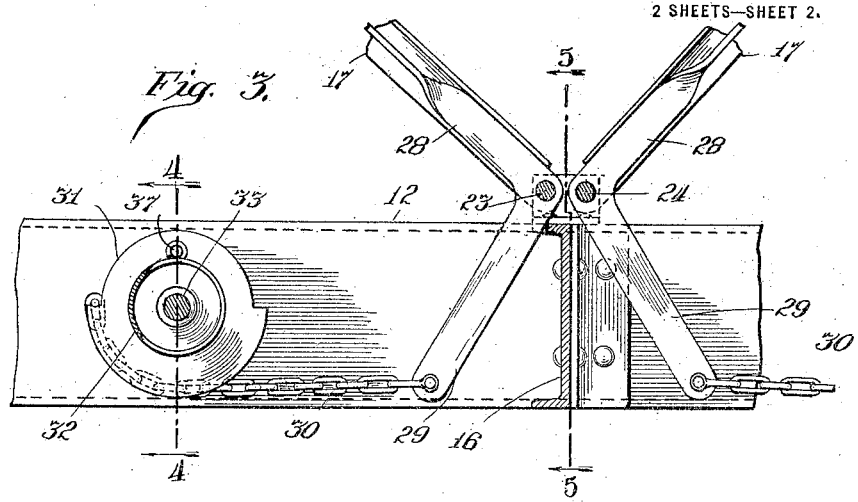
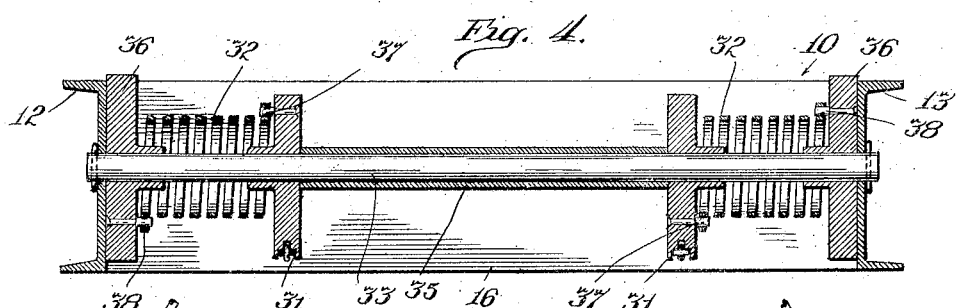
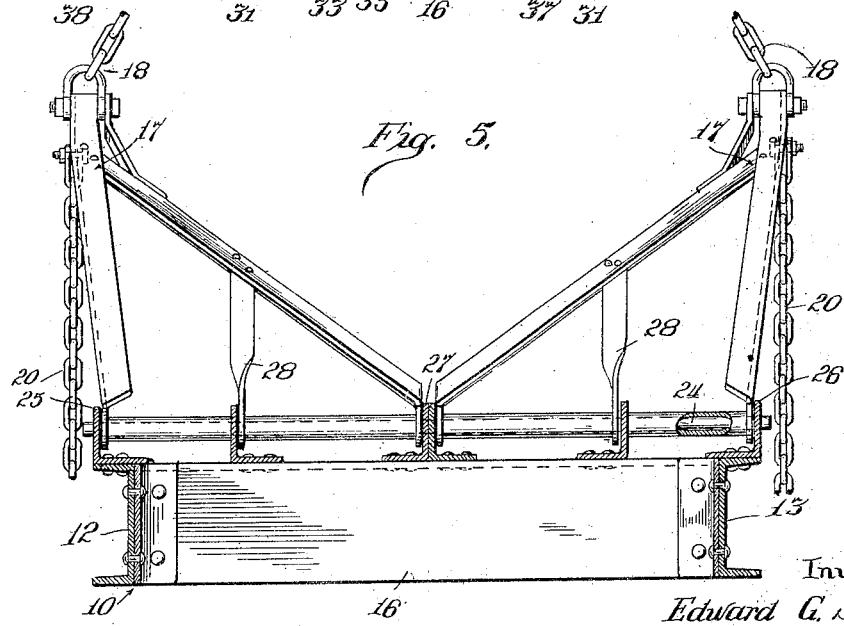

UNITED STATES PATENT OFFICE.

EDWARD G. SWARTZ, OF NEW ORLEANS, LOUISIANA.

LUMBER-CRADLE.

1,401,206. Specification of Letters Patent. Patented Dec. 27, 1921.

Application filed May 18, 1920. Serial No. 382,428.

*To all whom it may concern:*

Be it known that I, EDWARD G. SWARTZ, a citizen of the United States, and resident of New Orleans, parish of Orleans, and State of Louisiana, have invented certain new and useful Improvements in Lumber-Cradles, of which the following is a specification, and which are illustrated in the accompanying drawings, forming a part thereof.

The invention relates to hoisting apparatus and has for its object to provide an improved appliance for handling and transporting packages, such as the open work piles in which lumber is stacked for seasoning. As a long period of time is required for the seasoning of lumber in the open air, much space is required for the output of lumber about the mill where it is manufactured, during the seasoning period, and provision must be made for transporting the lumber from the mill to different parts of the storage area. It is accordingly a common practice to arrange the lumber in compact piles as it is produced at the mill and to then transport these compact piles of lumber to the selected parts of the storage area where the lumber is repiled in the familiar open work stacks employed for seasoning.

Obviously, the repiling of the lumber at the place of storage could be avoided if it were arranged in the open work piles in the first instance and the completed piles then transported to and deposited at the place selected for seasoning. This latter procedure has, however, been impracticable because no means for conveniently handling the open work piles without disarrangement of them has heretofore been available. The improvement provided by the present invention is designed to permit the arrangement of lumber in the open work piles immediately adjacent the mill and the transportation of the completed piles to the storage area. Also the rearrangement of the complete piles in the storage area from time to time, as occasion may require, and transportation of the complete piles to the loading platform at the end of the seasoning period. Repeated handling of the individual pieces of lumber is thus avoided and the labor of building the open work piles is greatly reduced for these may be erected at a place where they are accessible from all sides.

In the accompanying drawings.

Figure 1:
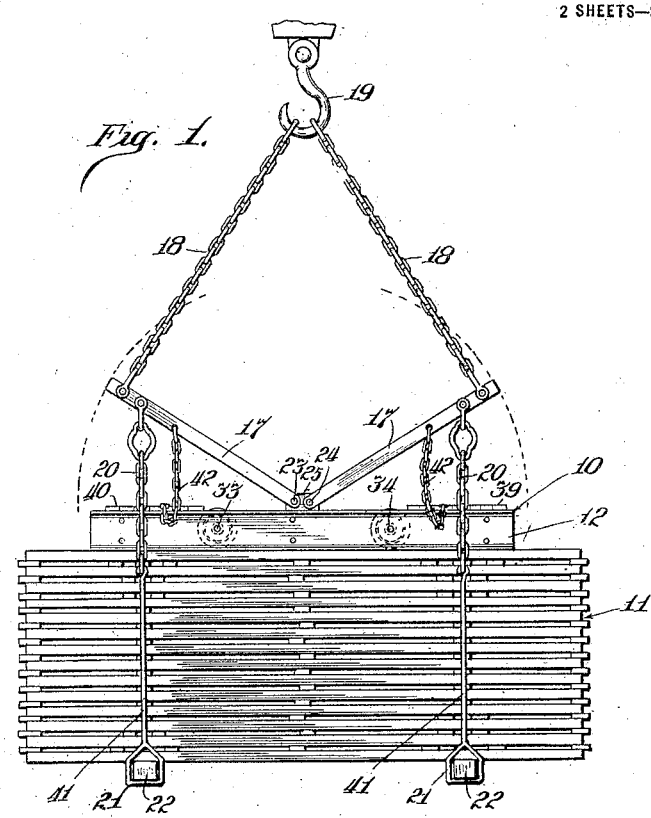
Figure 1 is a side elevation of an apparatus provided by the invention suspended from a crane hook and with an open work pile of lumber supported therein.
Figure 2:
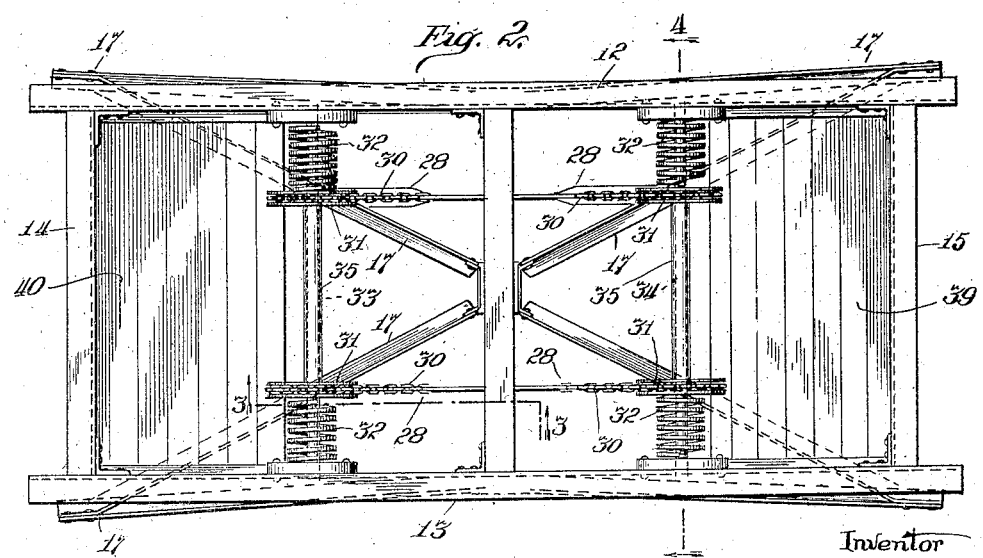
Fig. 2 is an inverted plan view of the apparatus.

Figs. 3 and 4 are detail sectional views taken on the lines 3—3 and 4—4 respectively on Fig. 2, the plane of section of Fig. 4 being also indicated by the line 4—4 on Fig. 3;

Fig. 5 is a transverse sectional view taken on the line 5—5 of Fig. 3.

In its preferred form the apparatus provided by the invention comprises an open frame, as 10, adapted to rest upon the pile of lumber 11 or other article to be transported. As shown the frame 10 is of rectangular shape and is composed of side channels 12, 13, end channels 14, 15, and an intermediate transverse channel 16. Mounted on the frame 10 are a plurality of swinging spring-controlled arms 17, shown as four in number. Each arm 17 is connected at its free end to a chain 18 or the like, which extends to a crane hook, or other suspending and transporting device 19. Likewise, a chain 20 hangs from each of the arms 17, these last mentioned chains being equipped with stirrups, or the like, 21, at their lower ends. In using the apparatus cross ties 22, which extend under the load, as 11, are engaged with the stirrups 21 at the lower ends of the corresponding chains 20 at opposite sides of the load. The load is thus suspended from the crane hook 19 through the two sets of chains 18 and 20, and it is firmly clamped or grippd between the cross ties 22 and the frame 10.

In the particular form of construction illustrated the four arms 17 are centrally pivoted upon the frame 10. These arms are arranged in pairs, one pair at each side of the frame 10 and the two arms of each pair extend from the central pivot toward the opposite ends of the frame. As shown the corresponding arms of the two pairs are connected to the frame 10 through a common pivot rod 23 or 24. (Fig. 3.) These pivot rods extend throughout the full width of the frame 10 immediately over the same and are mounted in bracket lugs 25, 26, 27, which are fixed upon the two side channels 12, 13 and on the intermediate transverse channel 16, of the frame. To obtain the required strength in the arms 17 and to insure satisfactory connection with the corresponding pivot rods 23, 24, each arm 17 is preferably constructed in approximately V-shape with the open end of the V at the inner end of the arm. Likewise, each arm 17 is formed with an intermediate longitudinal member 28 which extends to and beyond the corresponding pivot 23, 24, its projecting end 29 being at right angles to the main part of the arm and constituting a lever for swinging the arm. For this latter purpose a chain 30 extends from each lever 29 to a winding drum 31 and each winding drum 31 is controlled by a spring 32.

A substantial construction is provided by arranging the drums 31 in pairs with the two drums of each pair mounted upon a common spindle 33 or 34 which extends transversely through the frame 10. When this arrangement is employed the alinement of the drums 31 with the corresponding levers 29 is maintained by mounting a bushing 35 upon each of the spindles 33, 34, between the corresponding drums 31 and each of the springs 32 is coiled about the corresponding spindle 33 or 34 between the associated drum 31 and a block 36 which rests against the adjacent side channel 12 or 13, of the frame. As shown, each spring 32 reacts at its opposite ends upon a lug 37 carried by the associated drum 31 and a lug 38 mounted in the adjacent block 36. Each spring 32 accordingly tends to raise the free end of the corresponding arm 17.

It follows that when the frame 10 has been lowered upon a pile of lumber, as 11, resting upon cross ties 22 and the chains 18 are slack, the free ends of the arms 17 will be held in elevated positions by the springs 32 with the chains 20 hanging loosely from the arms. An operator riding on the frame 10, may now depress each arm 17 separately, against the corresponding spring 32 and hook the stirrups 21 over the ends of the cross ties 22. When each stirrup 21 has been engaged with the adjacent end of one of the cross ties 21, the corresponding arm 17 may be released by the operator. Accidental disengagement of the stirrups 21 from the cross ties 22 during the interval which elapses between the engagement of these parts and the raising of the load by elevation of the crane hook 19, or the like, is prevented by the raising of each arm 17 through its spring 32, when the corresponding chain 20 has been released by the operator.

For the convenience of the operator platforms 39 and 40 are built upon the frame 10 adjacent its opposite ends. Likewise, to facilitate the engagement and disengagement of the stirrups 21 and cross ties 22, the stirrups 21 may be formed with shanks 41 of such length as to be conveniently reached by the operator when kneeling upon one of the platforms 39, 40. It is also desirable to make some provision for limiting the upward swinging movement of the arms 17. For this purpose a short piece of chain 42 may be extended between each of the arms 17 and the adjacent side channel 12 or 13 of the frame. Operation of the apparatus in the manner described contemplates, however, that the chains 42 will be of such length as to hang slack when the chains 20 are drawn taut, whether by the weight of the load supported thereby or by the tension of the springs 32. The chains 42 will thus be drawn taut only when the stirrups 21 have been disengaged from the cross ties, as 22, beneath the load.

I claim as my invention:

1. A lumber cradle comprising, in combination, a frame adapted to rest upon the top of the load, an arm hingedly connected to the frame, a suspension device and lifting means both connected to the free end of the arm.

2. In a device of the kind described, in combination, a pair of relatively movable spring connected members one thereof being constructed for attachment to a lifting device and a suspension device carried by the last mentioned member.

3. In a device of the kind described, in combination, a frame, an arm hingedly connected to the frame, a spring controlling the swinging of the arm, a suspension device and lifting means both connected to the free end of the arm.

4. A lumber cradle comprising, in combination, a frame adapted to rest upon the top of the load, and a spring tensioned suspension device carried by the frame.

5. A lumber cradle comprising, in combination, a frame adapted to rest upon the top of the load, a spring tensioned suspension device carried by the frame, and lifting means connected to the suspension device.

6. In a device of the kind described, in combination, a pair of relatively movable members one thereof being constructed for attachment to a lifting device, a suspension device carried by the last mentioned member and a tensioning device reacting between the said two members.

7. In a device of the kind described, in combination, a frame, a suspension device carried by the frame and tensioning means reacting between the frame and the suspension device.

8. A cradle for the handling of multiple part packages without disarrangement of the parts of the package comprising, in combination, a suspension device adapted for connecting to a hoisting appliance and means other than the hoisting appliance for tensioning the said suspension device.

9. In a device of the kind described, in combination, a frame, an arm hingedly connected to the frame, a suspension device and means for attachment to a lifting device both connected to the free end of the arm and means limiting the swinging of the arm upon its said hinged connection with the frame.

10. In a device of the kind described, in combination, a frame, an arm hingedly connected to the frame, a suspension device and means for attachment to a lifting device both carried by the arm, a spring reacting between the frame and arm to raise the arm, and means limiting the raising of the arm.

11. A lumber cradle comprising, in combination, a frame adapted to rest upon the top of the load, an arm pivotally attached to the frame to swing in a vertical plane, a spring reacting between the frame and arm to lift the arm, means limiting the lifting of the arm, a load supporting member suspended from the arm and means for attachment to a lifting device carried by the arm.

12. A lumber cradle comprising, in combination, a frame adapted to rest upon the top of the load, an arm constructed for attachment to a lifting device pivotally attached to the frame to swing in a vertical plane, a spring reacting between the frame and arm to lift the arm, means limiting the lifting of the arm, and a stirrup for application to a load supporting member flexibly suspended from the arm.

EDWARD G. SWARTZ.